US012639990B2

(12) United States Patent
Yamada et al.

(10) Patent No.: US 12,639,990 B2
(45) Date of Patent: May 26, 2026

(54) INFORMATION PROCESSING DEVICE, VEHICLE, AND INFORMATION PROCESSING SYSTEM

(71) Applicant: TOYOTA JIDOSHA KABUSHIKI KAISHA, Toyota (JP)

(72) Inventors: Yoshihisa Yamada, Nagoya (JP); Taro Kawai, Toyota (JP); Hiroshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 18/461,670

(22) Filed: Sep. 6, 2023

(65) Prior Publication Data

US 2024/0119764 A1 Apr. 11, 2024

(30) Foreign Application Priority Data

Oct. 11, 2022 (JP) ................................ 2022-163079

(51) Int. Cl.
*G07C 5/00* (2006.01)
*B60W 40/09* (2012.01)
*B60W 50/00* (2006.01)

(52) U.S. Cl.
CPC .................................. *G07C 5/008* (2013.01)

(58) Field of Classification Search
CPC ....... G07C 5/008; B60W 40/09; B60W 50/00; B60W 50/0097; B60W 2050/0075; B60W 2540/10; B60W 2540/12; B60W 2540/18
USPC .......................................................... 701/117
See application file for complete search history.

(56) References Cited

U.S. PATENT DOCUMENTS

| | | | | |
|---|---|---|---|---|
| 10,235,882 | B1 * | 3/2019 | Aoude | G06N 5/046 |
| 2017/0016734 | A1 * | 1/2017 | Gupta | B60W 30/00 |
| 2019/0130753 | A1 * | 5/2019 | Graham | B60Q 9/008 |
| 2022/0144275 | A1 * | 5/2022 | Kudo | B60W 30/0956 |

FOREIGN PATENT DOCUMENTS

| | | |
|---|---|---|
| JP | 2008-186045 A | 8/2008 |
| JP | 2016-004495 A | 1/2016 |
| JP | 2019-012481 A | 1/2019 |

* cited by examiner

*Primary Examiner* — Tyler D Paige
(74) *Attorney, Agent, or Firm* — Oliff PLC

(57) ABSTRACT

An information processing device calculates a feature related to driving of a driver. The information processing device includes a processor that calculates the feature, and a transmission unit that transmits the calculated feature to an outside. The processor identifies whether there is a predetermined situation in which a risk occurs when turning right or left in a small radius, and calculates, when the predetermined situation is identified, information on a driving behavior for reducing the risk that is identified from information related to at least one of a steering wheel operation, an accelerator operation, and a brake operation of the driver, as the feature.

7 Claims, 5 Drawing Sheets

INFORMATION PROCESSING DEVICE, VEHICLE, AND INFORMATION PROCESSING SYSTEM

CROSS-REFERENCE TO RELATED APPLICATION

This application claims priority to Japanese Patent Application No. 2022-163079 filed on Oct. 11, 2022 incorporated herein by reference in its entirety.

BACKGROUND

1. Technical Field

This disclosure relates to an information processing device, a vehicle, and an information processing system, and particularly relates to an information processing device that calculates features related to driving of a driver, a vehicle including the information processing device, and an information processing system including the vehicle and a server.

2. Description of Related Art

There has been a driving diagnosis device that diagnoses the driving skill of a driver based on operation information on a driving operation by the driver of a vehicle (see, for example, Japanese Unexamined Patent Application Publication No. 2019-012481 (JP 2019-012481 A)).

SUMMARY

A new method is desired for evaluating the driving of a driver in response to various situations in driving a vehicle.

This disclosure provides an information processing device, a vehicle, an information processing system, an information processing method, and a storage medium capable of evaluating the driving of a driver when a risk occurs at turning right or left in a small radius.

An information processing device according to this disclosure is configured to calculate a feature related to driving of a driver. The information processing device includes one or more processors configured to calculate the feature, and a transmission unit configured to transmit the calculated feature to an outside. The one or more processors are configured to identify whether there is a predetermined situation in which a risk occurs when turning right or left in a small radius, and calculate, when the predetermined situation is identified, information on a driving behavior for reducing the risk that is identified from information related to at least one of a steering wheel operation, an accelerator operation, and a brake operation of the driver, as the feature.

With such a configuration, when identification is performed whether the predetermined situation exists in which a risk occurs at turning right or left in a small radius, information on the driving behavior for reducing the risk that is identified from information related to at least one of the steering wheel operation, the accelerator operation, and the brake operation of the driver, is calculated as a feature. The feature is transmitted to the outside. As a result, it is possible to provide an information processing device capable of evaluating the driving of the driver when a risk occurs at turning right or left in a small radius.

The predetermined situation is a situation in which a vehicle is moved close to an edge of a running lane before turning right or left in a small radius, and may be identified using information on the accelerator operation and a steering wheel angle.

With such a configuration, it possible to evaluate the driving of the driver in a situation in which the vehicle is moved close to the edge of the running lane before turning right or left in a small radius, when a risk occurs at turning right or left in a small radius.

The predetermined situation may further be identified using information on a brake operation.

With such a configuration, it possible to more accurately evaluate the driving of the driver in a situation in which the vehicle is moved close to the edge of the running lane before turning right or left in a small radius, when a risk occurs at turning right or left in a small radius.

The predetermined situation is a situation in which a turn driving of turning right or left in a small radius is performed, and may be identified using information related to at least one of a steering wheel angle, a yaw rate, and a right and left wheel velocity.

With such a configuration, it possible to evaluate the driving of the driver in a situation in which the vehicle performs a turn driving of turning right or left in a small radius, when a risk occurs at turning right or left in a small radius.

The one or more processors may be configured to calculate, as the feature, information related to a frequency with which the driving behavior for reducing the risk has been performed in the predetermined situation.

With such a configuration, it is possible to appropriately evaluate the driving of the driver when a risk occurs at turning right or left in a small radius, depending on the frequency with which the driving behavior for reducing the risk in a predetermined situation when a risk occurs at turning right or left in a small radius has been performed.

According to another aspect of this disclosure, a vehicle includes an information processing device configured to calculate a feature related to driving of a driver. The information processing device includes one or more processors configured to calculate the feature, and a transmission unit configured to transmit the calculated feature to an outside. The one or more processors are configured to identify whether there is a predetermined situation in which a risk occurs when turning right or left in a small radius, and calculate, when the predetermined situation is identified, information on a driving behavior for reducing the risk that is identified from information related to at least one of a steering wheel operation, an accelerator operation, and a brake operation of the driver, as the feature.

With such a configuration, it is possible to provide a vehicle capable of evaluating the driving of the driver when a risk occurs at turning right or left in a small radius.

According to still another aspect of this disclosure, an information processing system includes a vehicle and a server. The vehicle includes an information processing device configured to calculate a feature related to driving of a driver. The information processing device includes one or more processors configured to calculate the feature, and a transmission unit configured to transmit the calculated feature to an outside. The one or more processors are configured to identify whether there is a predetermined situation in which a risk occurs when turning right or left in a small radius, and calculate, when the predetermined situation is identified, information on a driving behavior for reducing the risk that is identified from information related to at least one of a steering wheel operation, an accelerator operation, and a brake operation of the driver, as the feature. The server is configured to execute a predetermined process on the feature.

With such a configuration, it is possible to provide an information processing system capable of evaluating the driving of the driver when a risk occurs at turning right or left in a small radius.

According to still another aspect of this disclosure, an information processing method is executed by an information processing device that calculates a feature related to driving of a driver. The information processing device includes one or more processors that calculate the feature, and a transmission unit that transmits the calculated feature to an outside. The information processing method includes identifying, by the one or more processors, whether there is a predetermined situation in which a risk occurs when turning right or left in a small radius, and calculating, by the one or more processors, when the predetermined situation is identified, information on a driving behavior for reducing the risk that is identified from information related to at least one of a steering wheel operation, an accelerator operation, and a brake operation of the driver, as the feature.

With such a configuration, it is possible to provide an information processing method capable of evaluating the driving of the driver when a risk occurs at turning right or left in a small radius.

According to still another aspect of this disclosure, a non-transitory storage medium stores instructions executable by one or more processors of an information processing device that calculates a feature related to driving of a driver. The information processing device includes the one or more processors that calculate the feature, and a transmission unit that transmits the calculated feature to an outside. The instructions cause the one or more processors to execute functions including, performing identification whether a predetermined situation exists in which a risk occurs at turning right or left in a small radius, and when the predetermined situation is identified, calculating information on a driving behavior for reducing the risk that is identified from information related to at least one of a steering wheel operation, an accelerator operation, and a brake operation of the driver, as the feature.

With such a configuration, it is possible to provide a storage medium capable of evaluating the driving of the driver when a risk occurs at turning right or left in a small radius.

This disclosure can provide an information processing device, a vehicle, an information processing system, an information processing method, and a storage medium capable of evaluating the driving of a driver when a risk occurs at turning right or left in a small radius.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
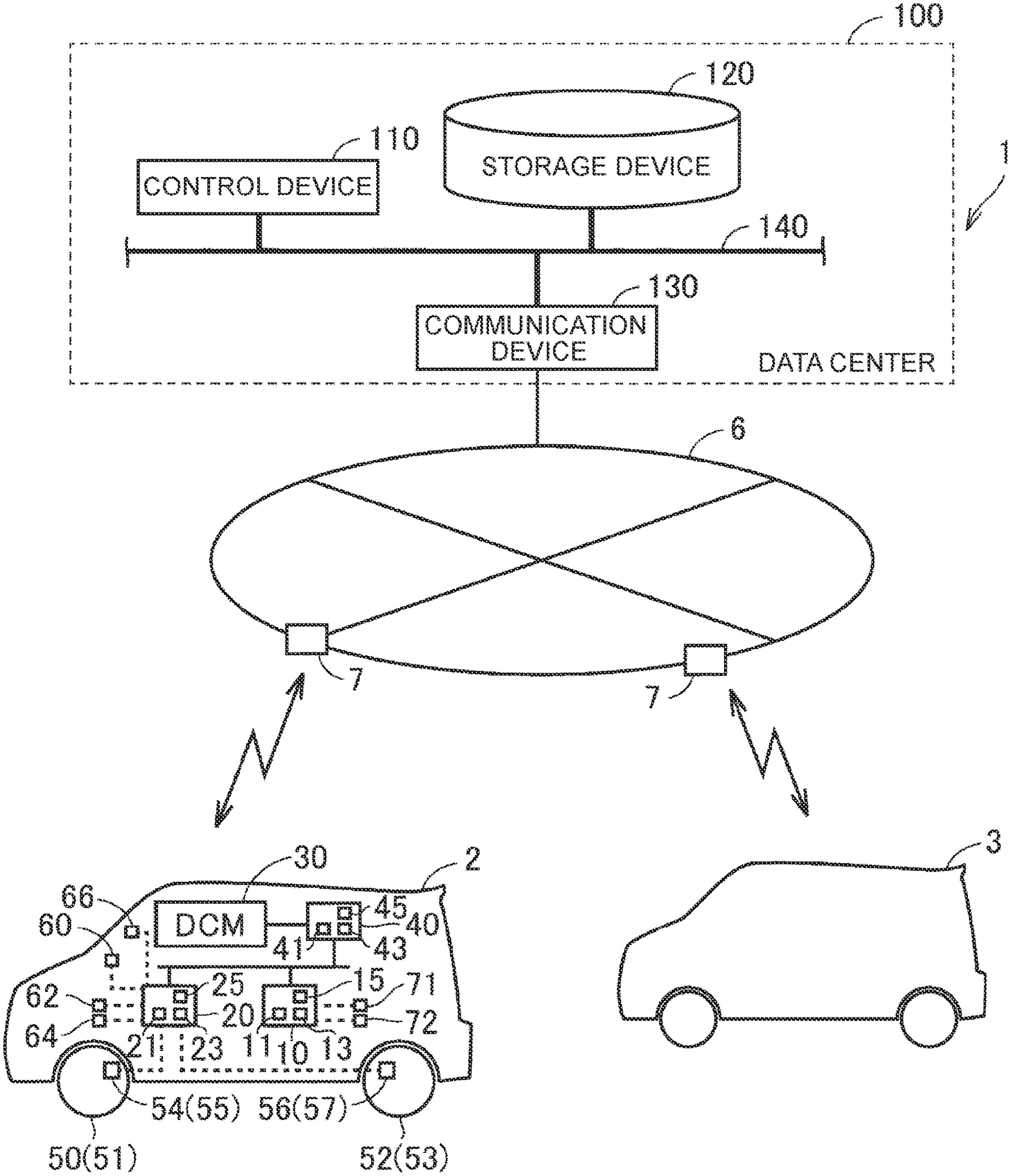
FIG. 1 illustrates an example of a configuration of a vehicle information management system.

Hereinafter, embodiments of the present disclosure will be described in detail with reference to the drawings. The same or corresponding parts in the drawings are denoted by the same reference signs, and the description thereof will not be repeated.

FIG. 1 illustrates an example of the configuration of a vehicle information management system 1. As shown in FIG. 1, in the present embodiment, the vehicle information management system 1 includes a plurality of vehicles 2, 3, a communication network 6, base stations 7, and a data center 100.

The vehicles 2, 3 may be any vehicles capable of communicating with the data center 100. For example, the vehicles 2, 3 may be vehicles using an engine as a driving source, battery electric vehicles using an electric motor as a driving source, or hybrid electric vehicles equipped with an engine and an electric motor and using either or both of the engine and the electric motor as a driving source. Although FIG. 1 shows only two vehicles 2, 3 for convenience of description, the number of vehicles is not particularly limited to two, and may be three or more.

The vehicle information management system 1 is configured to acquire predetermined information from the vehicles 2, 3 configured to communicate with the data center 100, and manage the acquired information.

The data center 100 includes a control device 110, a storage device 120, and a communication device 130. The control device 110, the storage device 120, and the communication device 130 are connected to each other via a communication bus 140 so that these devices 110, 120, and 130 can communicate with each other.

Although not shown in the figure, the control device 110 is configured to include a central processing unit (CPU), a memory (such as a read-only memory (ROM) and a random access memory (RAM)), and an input and output port for inputting and outputting various signals. Various controls that are performed by the control device 110 are implemented by software processing, that is, by the CPU reading a program stored in the memory. The various controls that are performed by the control device 110 can also be implemented by a general-purpose server (not shown) executing a program stored in a storage medium. However, the various controls that are performed by the control device 110 need not necessarily be implemented by the software processing, and may be implemented by processing with dedicated hardware (electronic circuit).

The storage device 120 stores predetermined information on the vehicles 2, 3 configured to communicate with the data center 100. The predetermined information includes, for example, information on a feature of each vehicle 2, 3 that will be described later, and information identifying each vehicle 2, 3 (hereinafter referred to as vehicle identification (ID)). The vehicle ID is unique information set for each vehicle. The data center 100 can identify a sender vehicle by the vehicle ID.

The communication device 130 implements bidirectional communication between the control device 110 and the communication network 6. The data center 100 can communicate with a plurality of vehicles including the vehicles 2, 3 via the base stations 7 on the communication network 6 by using the communication device 130.

Next, a specific configuration of the vehicles 2, 3 will be described. Since the vehicles 2, 3 basically have the same configuration, the configuration of the vehicle 2 will be representatively described below.

The vehicle 2 includes right and left drive wheels 50, 51 and right and left driven wheels 52, 53. When the drive wheels 50, 51 are rotated by the operation of the driving source, a driving force acts on the vehicle 2 and the vehicle 2 moves accordingly.

The vehicle 2 further includes an advanced driver assistance system-electronic control unit (ADAS-ECU) 10, a brake ECU 20, a Data Communication Module (DCM) 30, and a central ECU 40.

Each of the ADAS-ECU 10, the brake ECU 20, and the central ECU 40 is a computer including a processor such as CPUs 11, 21, 41 that executes a program, memories 15, 25, 45, and input and output interfaces 13, 23, 43.

The ADAS-ECU 10 includes a driver assistance system having functions related to driver assistance of the vehicle 2. The driver assistance system is configured to implement various functions to assist in driving of the vehicle 2 including at least one of the following three controls of the vehicle 2 by running an application installed on the driver assistance system: steering control, drive control, and braking control. Examples of the application installed on the driver assistance system include an application that implements functions of an autonomous driving (AD) system, an application that implements functions of an automated parking system, and an application that implements functions of an advanced driver assistance system (ADAS) (hereinafter referred to as the “ADAS application”).

For example, the ADAS application includes at least one of the following applications: an application that implements functions of vehicle following driving (adaptive cruise control (ACC) etc.) for maintaining a constant distance to a vehicle ahead, an application that implements functions of an auto speed limiter (ASL) for perceiving a velocity limit and maintaining the maximum velocity of the vehicle 2 to the velocity limit, an application that implements functions of lane keeping assistance (lane keeping assist (LKA), lane tracing assist (LTA), etc.) for keeping the vehicle 2 within its lane, an application that implements functions of collision damage reduction braking (autonomous emergency braking (AEB), pre-crash safety (PCS), etc.) for automatically braking the vehicle 2 in order to reduce damage from a collision, and an application that implements functions of lane deviation warning (lane departure warning (LDW), lane departure alert (LDA), etc.) for alerting a driver of the vehicle 2 that the vehicle 2 is deviating from its lane.

Each application on the driver assistance system outputs to the brake ECU a request for a kinematic plan that guarantees the merchantability (functionality) of the application alone, based on information on the vehicle surroundings acquired (input) from a plurality of sensors, an assistance request from the driver, etc. Examples of the sensors include a vision sensor such as a forward-facing camera 71, a millimeter wave radar 72, a light detection and ranging (LiDAR) sensor, and a location detection device.

The forward-facing camera 71 captures a video of a view ahead of the vehicle 2 and sends data of the captured video to the ADAS-ECU 10. The millimeter wave radar 72 is a sensor that measures the distance, velocity, and angle of objects in front of and around the vehicle 2 using radio waves in the millimeter-wave (30 GHz band to 300 GHz band) band, and that sends data of the measured results to the ADAS-ECU 10. However, a plurality of sensors connected to the ADAS-ECU 10 is not limited to being connected to the ADAS-ECU 10. Any of the sensors may be connected to other ECUs, and the data of the detection results of that sensor may be input to the ADAS-ECU 10 via a communication bus or the central ECU 40.

Each application acquires, as perceived sensor information, information on the vehicle surroundings obtained by integrating the detection results from one or more sensors, and also acquires an assistance request from the driver via a user interface (not shown) such as a switch. For example, each application can recognize other vehicles, obstacles, or people around the vehicle by performing image processing using artificial intelligence (AI) and image processing processors on images and videos of the surroundings of the vehicle acquired by multiple sensors.

The kinematic plan includes, for example, a request regarding longitudinal acceleration/deceleration to be generated in the vehicle 2, a request regarding the steering angle of the vehicle 2, a request regarding holding the stopped state of the vehicle 2, and the like.

The brake ECU 20 controls a brake actuator that generates a braking force on the vehicle 2 by using the detection results from the sensors. The brake ECU 20 also sets a motion request for the vehicle 2 that fulfills the requests of the kinematic plan from the ADAS-ECU 10. The motion request for the vehicle 2 set by the brake ECU 20 is fulfilled by an actuator system (not shown) mounted on the vehicle 2. The actuator system includes, for example, a plurality of types of actuator systems such as a powertrain system, a brake system, and a steering system.

For example, a steering angle sensor 60, an accelerator pedal depression amount sensor 62, a brake pedal depression amount sensor 64, a gyro sensor 66, a left front wheel velocity sensor 54, a right front wheel velocity sensor 55, a left rear wheel velocity sensor 56, and a right rear wheel velocity sensor 57 are connected to the brake ECU 20.

The steering angle sensor 60 detects the steering angle. The steering angle sensor 60 transmits a signal indicating the detected steering angle to the brake ECU 20.

The accelerator pedal depression amount sensor 62 detects the depression amount of an accelerator pedal (not shown). The accelerator pedal depression amount sensor 62 transmits a signal indicating the detected depression amount of the accelerator pedal to the brake ECU 20.

The brake pedal depression amount sensor 64 detects the depression amount of a brake pedal (not shown). The brake pedal depression amount sensor 64 transmits a signal indicating the detected depression amount of the brake pedal to the brake ECU 20.

The gyro sensor 66 detects the angular velocity of the vehicle 2 of at least around the yaw axis (which may include the roll axis and the pitch axis). The gyro sensor 66 transmits a signal indicating the detected angular velocity to the brake ECU 20.

The left front wheel velocity sensor 54 detects the number of rotations (wheel velocity) of the left front wheel (left drive wheel 50). The left front wheel velocity sensor 54 transmits a signal indicating the detected number of rotations of the left drive wheel 50 to the brake ECU 20. The right front wheel velocity sensor 55 detects the number of rotations (wheel velocity) of the right front wheel (right drive wheel 51). The right front wheel velocity sensor 55 transmits a signal indicating the detected number of rotations of the right drive wheel 51 to the brake ECU 20.

The left rear wheel velocity sensor 56 detects the number of rotations of the left rear wheel (left driven wheel 52). The left rear wheel velocity sensor 56 transmits a signal indicating the detected number of rotations of the left driven wheel 52 to the brake ECU 20. The right rear wheel velocity sensor 57 detects the number of rotations of the right rear wheel (right driven wheel 53). The right rear wheel velocity sensor 57 transmits a signal indicating the detected number of rotations of the right driven wheel 53 to the brake ECU 20.

The configuration in which the steering angle sensor 60, the accelerator pedal depression amount sensor 62, the brake pedal depression amount sensor 64, the gyro sensor 66, the left front wheel velocity sensor 54, the right front wheel velocity sensor 55, the left rear wheel velocity sensor 56, and the right rear wheel velocity sensor 57 are connected to the brake ECU 20 and directly transmit the detection results to the brake ECU 20 is illustrated as an example in FIG. 1. However, any of the sensors may be connected to other ECUs, and the detection results of that sensor may be input to the brake ECU 20 via a communication bus or the central ECU 40.

For example, the brake ECU 20 receives information on the running state of various applications, receives information on other driving operations such as a shift range, and receives information on the behavior of the vehicle 2, in addition to receiving the information on the kinematic plan from the ADAS-ECU 10.

The DCM 30 is a communication module configured to bidirectionally communicate with the data center 100.

The central ECU 40 is configured to communicate with, for example, the brake ECU 20, and is also configured to communicate with the data center 100 using the DCM 30. For example, the central ECU 40 sends information received from the brake ECU to the data center 100 via the DCM 30.

In the present embodiment, the central ECU 40 has been described as an ECU that sends information received from the brake ECU 20 to the data center 100 via the DCM 30. For example, the central ECU 40 may have a function (gateway function) such as relaying communication between various ECUs. Alternatively, the central ECU 40 may include a memory (not shown) whose stored contents can be updated using update information from the data center 100, and may be an ECU from which predetermined information including update information stored in the memory is read by various ECUs when the system of the vehicle 2 is started.

In the vehicle 2 having the configuration described above, it is conceivable to diagnose the driving skill of the driver based on the operation information on the driving operation by the driver of the vehicle. In this case, a method is desired for evaluating the driving skill of the driver in response to various situations in driving the vehicle.

Therefore, the brake ECU 20 identifies whether a predetermined situation exists in which a risk occurs at turning right or left in a small radius. When the predetermined situation is identified, the brake ECU 20 calculates, as a feature, information on driving behavior for reducing the risk that is identified from information related to at least one of the steering wheel operation, the accelerator operation, and the brake operation of the driver.

Figure 6:
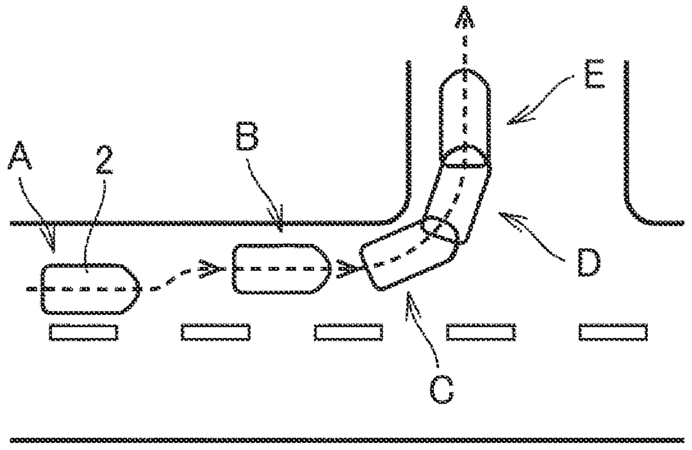
FIG. 6 is a diagram showing a state transition of turning right or left in a small radius in the present embodiment.

Turning right or left in a small radius is, in countries or regions where the law of left hand traffic of the vehicle is applied, a way of turning left to a running lane or a site on the left of the running lane when running on the left edge of the running lane (the leftmost running lane when there are multiple lanes), or a way of turning right to a running lane or a site on the right of the running lane when running on the right edge of the running lane when there is no oncoming lane (see FIG. 6 that will be described later). It should be noted that in countries or regions where the law of right hand traffic of the vehicle is applied, the right and left are reversed in the definition of the turning right or left in a small radius compared to the case of the above left hand traffic.

When identification is performed whether the predetermined situation exists in which a risk occurs at turning right or left in a small radius, information on the driving behavior for reducing the risk that is identified from information related to at least one of the steering wheel operation, the accelerator operation, and the brake operation of the driver, is calculated as a feature, and the feature is transmitted to the outside. As a result, the driving of the driver can be evaluated when a risk occurs at turning right or left in a small radius.

Figure 2:
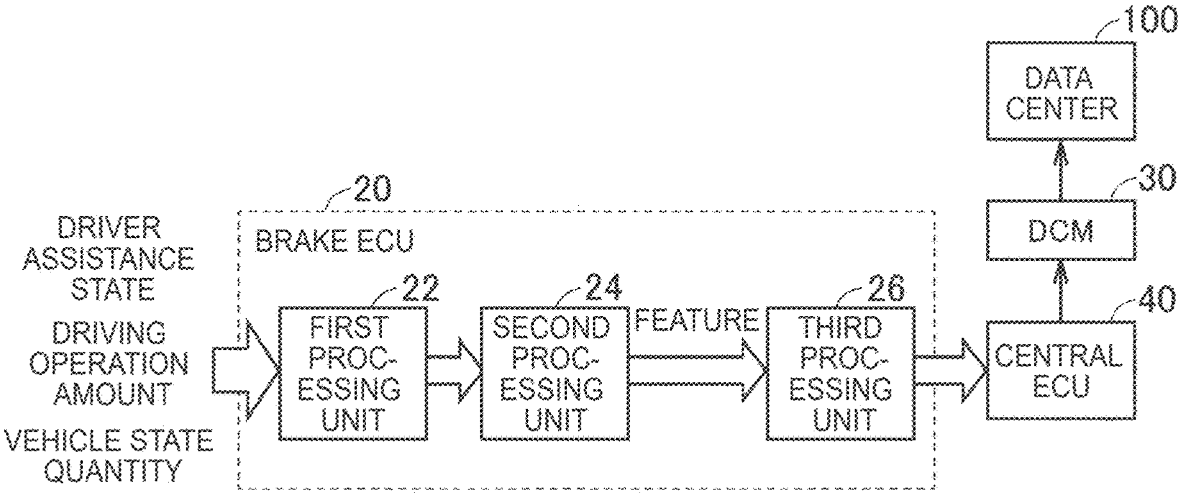
FIG. 2 illustrates a configuration of an example of a vehicle information processing device according to the present embodiment.

FIG. 2 illustrates the configuration of an example of a vehicle information processing device according to the present embodiment. The vehicle information processing device according to the present embodiment is implemented by the brake ECU 20.

The brake ECU 20 includes a first processing unit 22, a second processing unit 24, and a third processing unit 26. The first processing unit 22, the second processing unit 24, and the third processing unit 26 are virtually configured inside the brake ECU 20 by the cooperative operation of the CPU 21, the memory 25, and the input and output interface 23 of the brake ECU 20.

The first processing unit 22 receives information indicating the depression amount of the accelerator pedal, information indicating the depression amount of the brake pedal, information indicating the operation angle of the steering wheel, and the angular velocity of the yaw axis of the vehicle 2 as information on the driving operation for the vehicle 2. The first processing unit 22 also receives information indicating requests of a kinematic plan from the ADAS-ECU 10 and the operating state of the driver assistance system as the information on the operating state of the driver assistance of the vehicle 2. The first processing unit 22 also receives information indicating the detection results from various sensors as the information on the behavior of the vehicle 2. The first processing unit 22 outputs to the second processing unit 24 input information received during the period in which a predetermined condition is satisfied out of the period in which the first processing unit 22 receives input information.

The second processing unit 24 calculates a feature related to the operation of the vehicle 2 by using the input information received during the period in which the predetermined condition is satisfied out of the period in which the first processing unit 22 receives input information.

Figure 3:
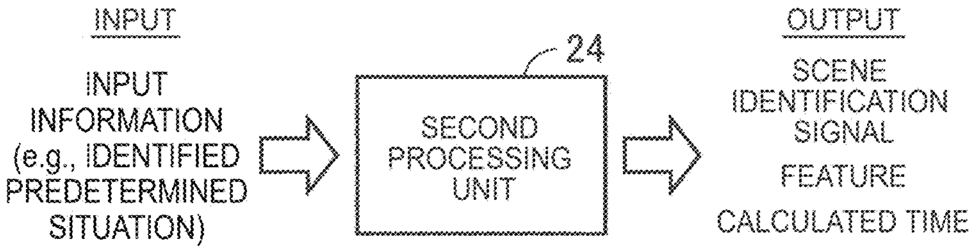
FIG. 3 illustrates an example of a process that is performed by a second processing unit.

FIG. 3 illustrates an example of a process that is performed by the second processing unit 24. As shown in FIG. 3, the input information is input to the second processing unit 24. The second processing unit 24 determines whether the predetermined condition is satisfied by using the input information.

The predetermined condition includes a condition that the driving situation of the vehicle 2 is a predetermined driving situation. In the present embodiment, the feature indicates, for example, a driving behavior for reducing the risk at turning right or left in a small radius.

For example, the feature indicates a personal feature such as the frequency of risk reduction behavior with respect to the total number of sampled scenes that satisfies the predetermined condition, and is specifically calculated by the following formula: the number of times of reduction behavior per trip/the total number of sampled scenes. The feature can be used to quantify the unevenness of the driver's behavior, and to estimate the driver's driving level during driving. Further, another feature indicates an objective feature such as an integrated value of the difference from a skilled driver's model, and is specifically calculated from the difference between the number of times of reduction behavior per trip in the expected value model of the skilled driver/the total number of sampled scenes and the number of times of reduction behavior per trip of the driver/the total number of sampled scenes. This another feature can be used to quantify the driver's proficiency level and to recognize how the driver deals with disturbances from surrounding traffic. The method for calculating the feature is not limited to the above calculation method.

When the second processing unit 24 determines that the predetermined condition is satisfied, the second processing unit 24 sets a flag indicating that the predetermined condition is satisfied. The second processing unit 24 outputs a signal indicating the state of the flag as a scene identification signal.

When the second processing unit 24 determines that the predetermined condition is satisfied, the second processing unit 24 calculates the feature described above by using the input information received during the period in which the predetermined condition is satisfied. For example, when the predetermined condition is satisfied, the second processing unit 24 calculates the feature, and stores (saves) the calculated feature in a memory in such a manner that the calculated feature is associated with time. The second processing unit 24 outputs the feature that has been calculated, together with the scene identification signal and time.

The third processing unit 26 uses the information output from the second processing unit 24 to execute preprocessing for transmitting the information to the central ECU via a controller area network (CAN). As the preprocessing, the third processing unit 26 executes, for example, anonymization of the feature (for example, statistical processing), or detects a change in the feature (for example, whether there is a change from the past trip or a sudden change).

Figure 4:
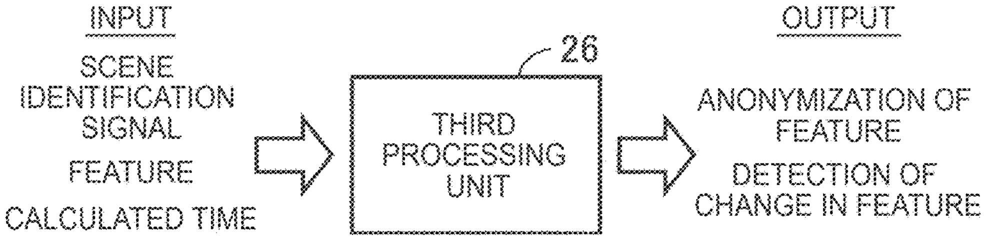
FIG. 4 illustrates an example of a process that is performed by a third processing unit.

FIG. 4 illustrates an example of a process that is performed by the third processing unit 26. As shown in FIG. 4, the third processing unit 26 receives information indicating the scene identification signal, the features, and the times from the second processing unit 24.

The third processing unit 26 outputs information necessary for the data center 100 to determine whether a change history of the feature corresponds to a predetermined state. The third processing unit 26 outputs the generated information to the central ECU 40.

The central ECU 40 sends the information received from the third processing unit 26 to the data center 100 via the DCM 30.

The information sent from the DCM 30 to the data center 100 includes, for example, the processed time, the scene identification number, and the feature (there is a plurality of sets of a scene identification number and a feature). Therefore, the data center 100 stores the information received from the DCM 30 in the storage device 120 in such a manner that the processed times, the scene identification number, and the feature are one set of data. The data center 100 can thus acquire a statistic of a change in the feature and a statistic of a change in driving behavior characteristics of the driver of each vehicle 2, 3 capable of communicating with the data center 100.

Figure 5:
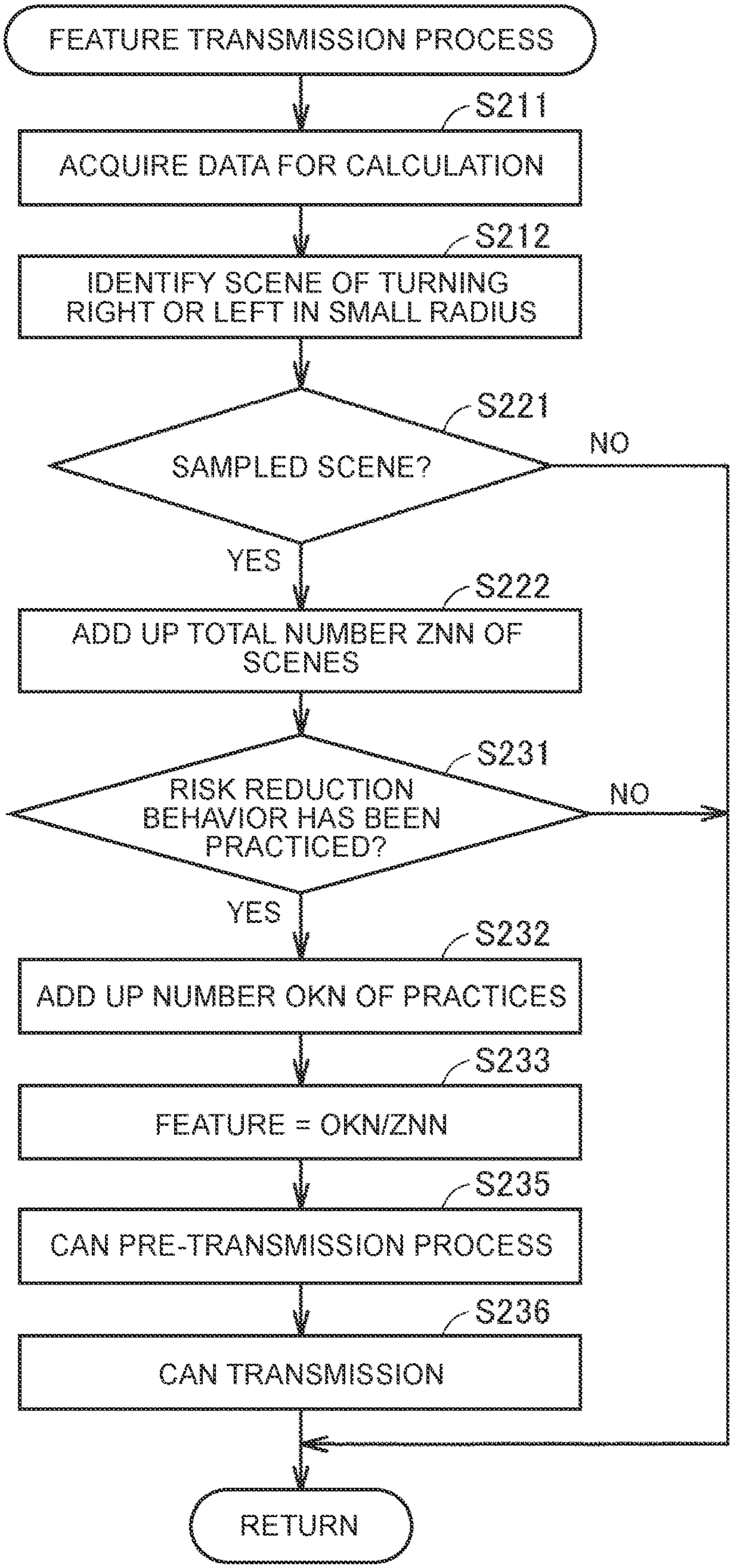
FIG. 5 is a flowchart showing the flow of a feature transmission process executed by a brake electronic control unit (ECU)

FIG. 5 is a flowchart showing the flow of a feature transmission process executed by the brake ECU 20. With reference to FIG. 5, this feature transmission process is called and executed at predetermined control intervals from a higher level process.

First, the brake ECU 20 acquires data for calculating the feature from various sensors or the ADAS-ECU 10 (step S211). Next, the brake ECU 20 identifies the scene of turning right or left in a small radius from the acquired data (step S212).

FIG. 6 is a diagram showing the state transition of turning right or left in a small radius in the present embodiment. With reference to FIG. 6, first, when the driver makes a left turn while the vehicle 2 is running as in state A, the driver slightly turns the steering wheel to the left, moves the vehicle 2 close to the left edge of the running lane, and immediately returns the steering wheel to the original position as shown in state B, to suppress a bicycle, motorbike, etc. from entering the left side of the vehicle 2, for the purpose of suppressing the bicycle, motorbike, etc. from getting caught. Then, as shown in states C to E, the driver turns the steering wheel sharply to the left at the corner to cause the vehicle 2 to turn left.

Figure 7:
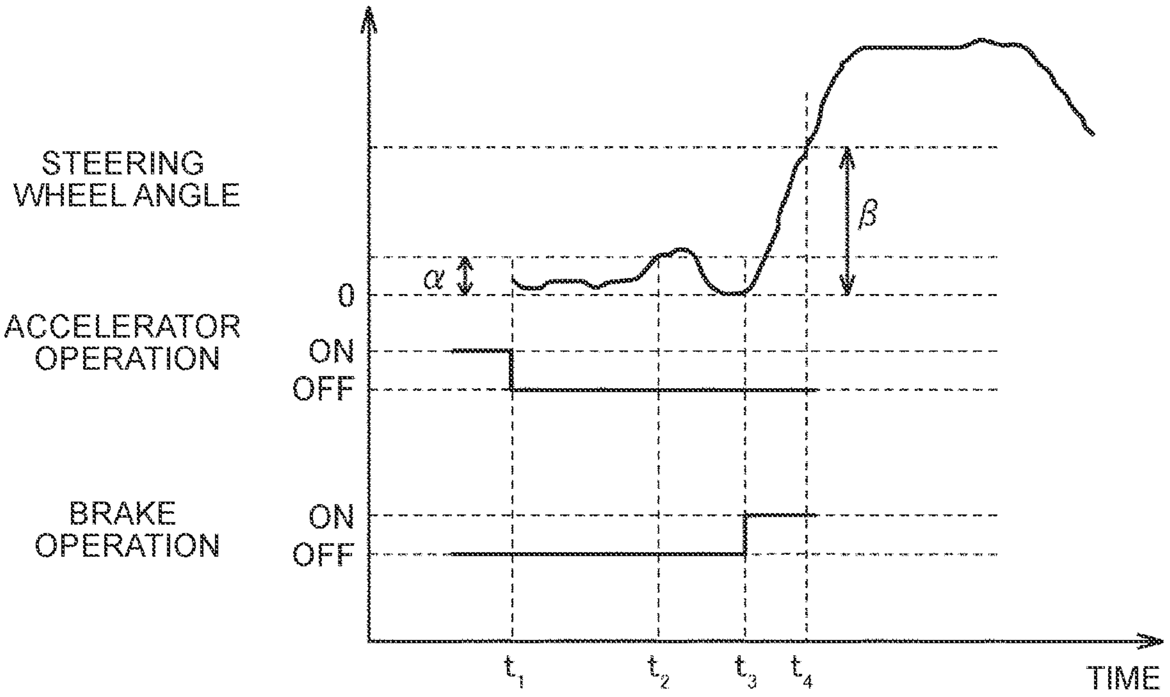
FIG. 7 is a diagram showing a change in various operations of turning right or left in a small radius in the present embodiment.

FIG. 7 is a diagram showing a change in various operations of turning right or left in a small radius in the present embodiment. With reference to FIG. 7, the horizontal axis indicates time. When making a left turn, first, at time t1, the driver turns the operation of the accelerator pedal from the ON state to the OFF state (first condition). After that, at time t2 within 10 seconds from time t1, the steering wheel angle is increased to a (for example, 30 degrees) or more in order to move the vehicle 2 close to the left edge of the running lane, and then returned to the original position (second condition). Next, at time t3 within two seconds from time t2, the driver turns the operation of the brake pedal from the OFF state to the ON state (third condition), and turns the steering wheel so that the vehicle 2 turns left. After that, at time t4, the steering wheel angle reaches β (for example, 90 degrees; 45 degrees for steer-by-wire) or more (fourth condition). Note that the thresholds included in these conditions may be determined with reference to the model driving operation of a skilled driver.

Then, the brake ECU 20 determines whether the scene of a change in the inter-vehicle distance is the sampled scene (in the present embodiment, the scene in which the first condition and the fourth condition are satisfied) (step S221). When it is determined that the scene of a change in the inter-vehicle distance is not the sampled scene (NO in step S221), the brake ECU 20 terminates the feature transmission process and returns the process to be executed to the higher level process (the caller).

When it is determined that the scene of a change in the inter-vehicle distance is the sampled scene (YES in step S221), the brake ECU 20 adds up the total number ZNN of scenes, that is, adds 1 to the original ZNN to set the value as a new ZNN (step S222).

Next, the brake ECU 20 determines whether the driving behavior for reducing the risk when turning right or left in a small radius (in the present embodiment, the driving behavior that moves the vehicle 2 close to the edge of the running lane before turning right or left, and specifically, the behavior in which the second condition and the third condition, in addition to the first condition and the fourth condition, are satisfied) has been practiced (step S231). When it is determined that the driver has not practiced a behavior that reduces the risk (NO in step S231), the brake ECU 20 terminates the feature transmission process and returns the process to be executed to the higher level process (the caller).

On the other hand, when it is determined that the driver has practiced a behavior that reduces the risk (YES in step S231), the brake ECU 20 adds up the number OKN of practices, that is, adds 1 to the original OKN to set the value as a new OKN (step S232).

Subsequently, the brake ECU 20 calculates the feature=OKN/ZNN (step S233).

When the current time is the time of the end of the current trip, the brake ECU 20 executes anonymization of the feature (for example, statistical processing) as a CAN pre-transmission process (step S235). Specifically, the brake ECU 20 calculates the maximum value, the minimum value, and the standard deviation of OKN/ZNN for a predetermined number of past trips (for example, 50 times) for the feature.

Next, the brake ECU 20 sends the scene identification information, the maximum value, the minimum value, and the standard deviation of the feature OKN/ZNN, and the sudden change presence/absence flag to the central ECU 40 via the CAN (step S236). The central ECU 40 sends the received information to the data center 100 via the DCM 30. The control device 110 of the data center 100 executes a predetermined process on the feature identified by the received information (for example, a process of storing the feature in the storage device 120 and statistical processing for the feature stored in the storage device 120).

Second Embodiment

In the first embodiment, the feature of the driving behavior that moves the vehicle close to the edge of the running lane before turning right or left when turning right or left in a small radius is shown. In the second embodiment, the feature of the driving behavior that turns right or left when turning right or left in a small radius is shown.

Figure 8:
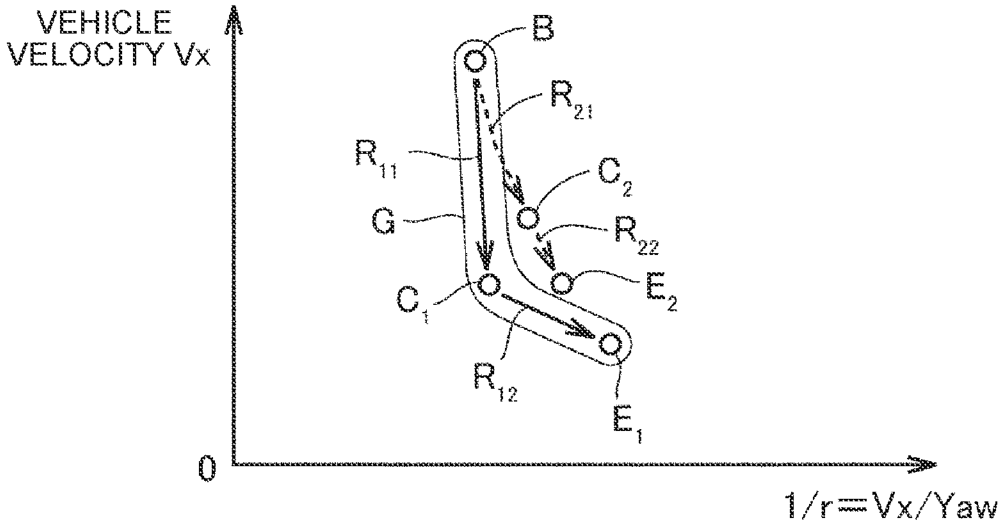
FIG. 8 is a diagram illustrating a calculation of a feature according to a second embodiment.

FIG. 8 is a diagram illustrating the calculation of the feature according to the second embodiment. With reference to FIG. 8, the vertical axis indicates the vehicle velocity Vx of the vehicle 2. The horizontal axis indicates the turning curvature 1/r=Vx/Yaw (Yaw: yaw rate (angular velocity of the yaw axis)).

When the driver is not a skilled driver, the vehicle 2 starts turning while decelerating the vehicle velocity Vx from the state B shown in FIG. 6. Accordingly, the vehicle 2 reaches a state $C_2$ via a route $R_{21}$. After that, by further decelerating the vehicle velocity Vx while further turning the vehicle 2, the vehicle 2 reaches a state $E_2$ via a route $R_{22}$.

On the other hand, for the model driving operation of a skilled driver, the vehicle 2 does not start turning from the state B shown in FIG. 6, and reaches a state $C_1$ via a route $R_{11}$ by sufficiently decelerating the vehicle velocity Vx. After that, by sharply turning the vehicle 2 while further decelerating the vehicle velocity Vx, the vehicle 2 reaches a state $E_1$ via a route $R_{12}$. As described above, compared to the case where the driving operation is not the model driving operation of a skilled driver, the amount of decrease in vehicle velocity before turning is sufficient, and the turning curvature is sharp and large. Therefore, it is possible to turn without leaving the corner too far, bulging outward, or making a big turn.

Therefore, the scene from the condition that the steering wheel angle is β (for example, 90 degrees; 45 degrees for steer-by-wire) or more (11th condition), the condition that the yaw rate of the vehicle 2 exceeds a predetermined value (for example, 20 degrees/s) (12th condition), and the condition that the difference between the right and left wheel velocities exceeds 2 km/h (13th condition) are satisfied until the condition that the steering wheel angle becomes less than γ (for example, 30 degrees) (14th condition) is satisfied, is set to be a sampled scene. Then, in step S222 of FIG. 5, the total number ZNN of the sampled scenes is added up.

In this sampled scene, in step S231 of FIG. 5, it is determined whether the route of the driver is included in a specific range G including the routes $R_{11}$, $R_{12}$ of the model driving operation of the skilled driver of FIG. 6, to determine whether a behavior that reduces the risk has been practiced. When it is determined that the behavior has been practiced, in step S232, the number of times of the behavior that reduces the risk has been practiced is added up as OKN. Then, in step S233, the feature=OKN/ZNN is calculated.

Other Modifications (1) In the embodiments described above, as shown in FIGS. 5 to 8, whether the scene is a sampled scene is determined by whether the first condition to the fourth condition are satisfied, or whether the 11th condition to the 14th condition are satisfied. However, the present disclosure is not limited to this, and when whether the scene is a sampled scene is identified from the information related to at least one of the steering wheel operation, the accelerator operation, and the brake operation of the driver, other methods may be used to identify whether the scene is a sampled scene.

(2) In the embodiments described above, as shown in FIGS. 5 to 8, whether the driver has performed a driving behavior for reducing the risk when turning right or left in a small radius is determined, by whether the second condition and the third condition are satisfied, or whether the route of the operation result of the driver is included in the specific range G in FIG. 8. However, the present disclosure is not limited to this, and when the information on the driving behavior for reducing the risk identified from the information related to at least one of the steering wheel operation, the accelerator operation, and the brake operation of the driver is calculated as the feature, other methods may be used to calculate the feature.

(3) In the embodiments described above, as shown in FIGS. 5 to 8, the data detectable by the sensors of the vehicle 2 are used to identify the scene and the feature. However, the present disclosure is not limited to this, and the information outside the vehicle 2 (for example, the image of the camera on the site to which the vehicle 2 turned left or right, the image of the camera of the following vehicle or surrounding vehicles, or the detection information of the sensors) may be used to identify the scene and the feature.

(4) In the embodiments described above, the feature is calculated as shown in step S233 of FIG. 5. However, the present disclosure is not limited to this, and it is only necessary that the feature is an amount showing the driving of the driver when turning right or left in a small radius, and may be calculated by other methods. For example, the feature may be an amount obtained by adding up the difference between the feature OKN/ZNN of the skilled driver and the feature OKN/ZNN of the driver. Moreover, when a specific good behavior is performed, a point may be added to the feature. For example, the point may be added to the feature when the behavior that satisfies the second condition and the third condition is performed when turning right or left in a small radius in a case where a following vehicle is present.

(5) In the embodiments described above, statistical processing (anonymization) is performed by calculating the frequency OKN/ZNN. However, the present disclosure is not limited to this, and anonymization may be performed by performing other statistical processings such as a calculation of the average value, a calculation of the minimum value, a calculation of the maximum value, or a calculation of the standard deviation. Further, anonymization may be performed by calculating a feature that has changed suddenly or by calculating a feature that has changed gradually.

(6) In the embodiments described above, the past feature is transmitted at the end of the trip as shown in step S236 of FIG. 5. However, the present disclosure is not limited to this, and the past feature may be transmitted at other timings, for example, at the start of the trip or after a predetermined time (for example, several minutes such as five minutes) from the start of the trip.

(7) In the embodiments described above, the vehicle 2 includes the central ECU 40 as shown in FIG. 1. However, the present disclosure is not limited to this, and the central ECU 40 need not be included. In this case, data to be transmitted to the data center 100 is created in the brake ECU 20 and is transmitted to the data center 100.

(8) In the embodiments described above, the brake ECU 20 executes the process in FIG. 5. However, the present disclosure is not limited to this, and the process in FIG. 5 may be executed by another information processing device, for example, another ECU of the vehicle 2 or an external information processing device (for example, the data center 100).

(9) The embodiments described above can be regarded as a disclosure of an information processing device such as the brake ECU 20, can be regarded as a disclosure of vehicles 2, 3 including the information processing device, can be regarded as a disclosure of an information processing system such as the vehicle information management system 1 including the vehicles 2, 3 and a server such as the data center 100, can be regarded as a disclosure of an information processing method executed by the information processing device, and can be regarded as a disclosure of an information processing program executed by the information processing device.

SUMMARY (1) As shown in FIG. 1, the brake ECU 20 is an information processing device that calculates a feature related to driving of a driver, and includes a CPU 21 that calculates the feature and an input and output interface 23 that transmits the calculated feature to the outside. As shown in FIGS. 2 to 8, the CPU 21 identifies whether there is a predetermined situation (for example, a sampled scene) in which a risk occurs when turning right or left in a small radius (for example, step S212 and step S221). When the predetermined situation is identified, the CPU 21 calculates, as a feature, information on the driving behavior for reducing the risk that is identified from information related to at least one of the steering wheel operation, the accelerator operation, and the brake operation of the driver (for example, step S222 to step S233).

When identification is performed whether the predetermined situation exists in which a risk occurs at turning right or left in a small radius, information on the driving behavior for reducing the risk that is identified from information related to at least one of the steering wheel operation, the accelerator operation, and the brake operation of the driver, is calculated as a feature. The feature is transmitted to the outside. As a result, the driving of the driver can be evaluated when a risk occurs at turning right or left in a small radius.

(2) As shown in FIGS. 5 to 7, the predetermined situation is a situation in which the vehicle 2 is moved close to the edge of the running lane before turning right or left in a small radius, and may be identified using information on the accelerator operation and the steering wheel angle.

Thus, it possible to evaluate the driving of the driver in a situation in which the vehicle 2 is moved close to the edge of the running lane before turning right or left in a small radius, when a risk occurs at turning right or left in a small radius.

(3) As shown in FIGS. 5 to 7, the predetermined situation may further be identified using information on the brake operation.

Thus, it possible to more accurately evaluate the driving of the driver in a situation in which the vehicle 2 is moved close to the edge of the running lane before turning right or left in a small radius, when a risk occurs at turning right or left in a small radius.

(4) As shown in FIG. 8, the predetermined situation is a situation in which a turn driving of turning right or left in a small radius is performed, and may be identified using information related to at least one of the steering wheel angle, the yaw rate, and the right and left wheel velocity.

Thus, it possible to evaluate the driving of the driver in a situation in which the vehicle 2 performs a turn driving of turning right or left in a small radius, when a risk occurs at turning right or left in a small radius.

(5) As shown in FIG. 5, the CPU 21 may calculate, as a feature, information related to the frequency with which the driving behavior for reducing the risk have been performed in a predetermined situation (for example, step S233).

As a result, it is possible to appropriately evaluate the driving of the driver when a risk occurs at turning right or left in a small radius, depending on the frequency with which the driving behavior for reducing the risk in a predetermined situation when a risk occurs at turning right or left in a small radius has been performed.

The embodiment disclosed herein should be construed as illustrative in all respects and not restrictive. The scope of the present disclosure is shown by the claims rather than by the above description of the embodiment and is intended to include all modifications within the scope equivalent to the claims.

What is claimed is:

1. An information processing device of a vehicle comprising:

one or more processors configured to control a brake actuator of the vehicle, and calculate a feature related to driving of a driver of the vehicle based on information detected by a group of sensors including a steering angle sensor, an accelerator pedal sensor, and a brake pedal sensor; and a transmission unit configured to transmit the calculated feature to an external server, wherein the one or more processors are configured to:

identify, as a predetermined situation in which a risk occurs when turning right or left in a small radius, a situation in which the following has occurred: (i) the accelerator pedal sensor detects an acceleration operation to be off, (ii) the steering angle sensor detects a steering wheel angle to increase to a first threshold within a first time period from the detection of the acceleration to be off, (iii) the brake pedal sensor detects a brake operation to be ON within a second time period after the first time period and the steering wheel angle is below the first threshold, and (iv) the steering angle sensor detects the steering wheel angle increases from below the first threshold to a second threshold corresponding to the small radius turn, collect information only when the predetermined situation is identified, and calculate, when the predetermined situation is identified, the feature from the collected information indicating whether the vehicle exhibits a driving behavior for reducing the risk that is identified from the information related to at least one of a steering wheel operation, an accelerator operation, and a brake operation of the driver, and wherein the calculated feature is used to evaluate the driving of the driver when turning right or left in the small radius.

2. The information processing device according to claim 1, wherein the predetermined situation is the situation in which the vehicle is moved close to an edge of a running lane before turning right or left in the small radius, and is identified using the information on the accelerator operation and the steering wheel angle.

3. The information processing device according to claim 2, wherein the predetermined situation is further identified using the information on the brake operation.

4. The information processing device according to claim 1, wherein the predetermined situation is the situation in which a turn driving of turning right or left in the small radius is performed, and is identified using the information related to at least one of the steering wheel angle, a yaw rate, and a right and left wheel velocity.

5. The information processing device according to claim 1, wherein the one or more processors are configured to calculate, as the feature, information related to a frequency with which the driving behavior for reducing the risk has been performed in the predetermined situation.

6. A vehicle comprising:

an information processing device; and a group of sensors including a steering angle sensor, an accelerator pedal sensor, or a brake pedal sensor, wherein:

the information processing device includes:

one or more processors configured to control a brake actuator of the vehicle, and calculate a feature related to driving of a driver of the vehicle based on information detected by the group of sensors; and a transmission unit configured to transmit the calculated feature to an external server, wherein the one or more processors are configured to:

identify, as a predetermined situation in which a risk occurs when turning right or left in a small radius, a situation in which the following has occurred: (i) the accelerator pedal sensor detects an acceleration operation to be off, (ii) the steering angle sensor detects a steering wheel angle to increase to a first threshold within a first time period from the detection of the acceleration to be off, (iii) the brake pedal sensor detects a brake operation to be ON within a second time period after the first time period and the steering wheel angle is below the first threshold, and (iv) the steering angle sensor detects the steering wheel angle increases from below the first threshold to a second threshold corresponding to the small radius turn, collect information only when the predetermined situation is identified, and calculate, when the predetermined situation is identified, the feature from the collected information indicating whether the vehicle exhibits a driving behavior for reducing the risk that is identified from information related to at least one of a steering wheel operation, an accelerator operation, and a brake operation of the driver, as the feature, and wherein the calculated feature is used to evaluate the driving of the driver when turning right or left in the small radius.

7. An information processing system comprising:

a vehicle; and a server, the vehicle including an information processing device and a group of sensors including a steering angle sensor, an accelerator pedal sensor, or a brake pedal sensor, wherein:

the information processing device includes:

one or more processors configured to control a brake actuator of the vehicle, and calculate a feature related to driving of a driver of the vehicle based on information detected by the group of sensors; and a transmission unit configured to transmit the calculated feature to the server, wherein the one or more processors are configured to:

identify, a predetermined situation in which a risk occurs when turning right or left in a small radius, a situation in which the following has occurred: (i) the accelerator pedal sensor detects an acceleration operation to be off, (ii) the steering angle sensor detects a steering wheel angle to increase to a first threshold within a first time period from the detection of the acceleration to be off, (iii) the brake pedal sensor detects a brake operation to be ON within a second time period after the first time period and the steering wheel angle is below the first threshold, and (iv) the steering angle sensor detects the steering wheel angle increases from below the first threshold to a second threshold corresponding to the small radius turn, collect information only when the predetermined situation is identified, and calculate, when the predetermined situation is identified, the feature from the collected information indicating whether the vehicle exhibits a driving behavior for reducing the risk that is identified from information related to at least one of a steering wheel operation, an accelerator operation, and a brake operation of the driver, wherein the calculated feature is used to evaluate the driving of the driver when turning right or left in the small radius, and wherein the server is configured to execute a predetermined process on the feature for the evaluation of the driving of the driver.

* * * * *